UNITED STATES PATENT OFFICE.

CARL AUGUST SITZLER, OF KITZINGEN, GERMANY.

IMPROVEMENT IN PAINT COMPOUNDS.

Specification forming part of Letters Patent No. 145,130, dated December 2, 1873; application filed November 1, 1873.

*To all whom it may concern:*

Be it known that I, CARL AUGUST SITZLER, of Kitzingen, Bavaria, in Germany, have invented a new and Improved Paint Compound, of which the following is a specification:

My invention relates to improvement in paint compound, which is especially designed for protecting stone walls and outer surfaces of all kinds, cellar and stable walls, parts of machinery, &c.; being also useful for painting wood in all colors, and producing wall and roof papers.

The compound is impervious to moisture and air, of great durability, and, though pliant and elastic, of great hardness after having thoroughly dried on the objects by the free admission of air.

My invention consists, mainly, in the mixture of the following ingredients, and in the manner described, to wit: Four parts of silver litharge are ground with one part of sesquioxide of manganese, to which ten parts of what I term "balsam of sulphur-turpentine" are added. Said balsam is produced by dissolving equal parts of sulphur and linseed-oil in three times their weight of turpentine, the dissolution being accelerated by heating the parts under suitable temperature. Fifteen parts of zinc-white are then added to the foregoing, thoroughly ground therewith, and then combined with five parts of soluble glass, five parts of Venice turpentine, five parts of spirits of turpentine, fifteen parts of oil varnish, twenty parts of pulverized metallic iron, and twenty parts of Portland cement. The whole compound is then thoroughly mixed and ground together, producing a bluish-gray paint, which may be colored to any desirable tint by adding the coloring pigments in suitable quantity.

The paint is spread on the walls, wood, paper, or other article, in one or more thin coats, with a hard brush, after the walls have been thoroughly cleaned from all impurities, moisture, &c., and is then exposed to dry under a strong draft of fresh air, covering the objects completely, and assuming gradually a degree of hardness like that of stone or metal, which effectually resists the wear and tear for a considerable length of time. The paint may, therefore, be used for protecting floors, either directly by painting, or indirectly by being placed on paper of suitable pattern, and may, in similar manner, be applied to roofings and other exposed parts, being, on account of its qualities, of almost unlimited application in the various trades.

Having thus described my invention, I claim as new and desire to secure by Letters Patent—

The paint compound herein described, consisting mainly of pulverized iron, cement, oil varnish, spirits of turpentine, turpentine, soluble glass, mixed and combined with a ground solution of zinc-white, balsam of sulphur-turpentine, silver litharge, and manganese, substantially as and in the manner specified.

CARL AUGUST SITZLER.

Witnesses:
PAUL GOEPEL,
T. B. MOSHER.